(12) United States Patent
Nakagawa et al.

(10) Patent No.: US 9,099,293 B2
(45) Date of Patent: Aug. 4, 2015

(54) METHOD AND CIRCUIT FOR LIGHTING HIGH-PRESSURE DISCHARGE LAMP

(71) Applicant: Phoenix Electric Co., Ltd., Himeji-shi, Hyogo (JP)

(72) Inventors: Atsuji Nakagawa, Himeji (JP); Shiyoshi Cho, Himeji (JP); Shinichi Ushijima, Himeji (JP); Tetsuya Gouda, Himeji (JP)

(73) Assignee: PHOENIX ELECTRIC CO., LTD., Hyogo (JP)

( * ) Notice: Subject to any disclaimer, the term of this patent is extended or adjusted under 35 U.S.C. 154(b) by 0 days.

(21) Appl. No.: 14/483,618

(22) Filed: Sep. 11, 2014

(65) Prior Publication Data

US 2015/0123543 A1    May 7, 2015

(30) Foreign Application Priority Data

Nov. 1, 2013   (JP) ................. 2013-228419

(51) Int. Cl.
*H01J 61/52*   (2006.01)
*H01J 61/82*   (2006.01)
*H05B 41/14*   (2006.01)

(52) U.S. Cl.
CPC ............. *H01J 61/523* (2013.01); *H01J 61/822* (2013.01); *H05B 41/14* (2013.01)

(58) Field of Classification Search
CPC .................................................. H05B 3/0854
USPC ................. 315/309, 307, 291, 118, 117, 158; 353/39, 52, 54, 56, 57–60, 82, 85, 87, 353/121
See application file for complete search history.

(56) References Cited

U.S. PATENT DOCUMENTS

| 7,688,003 B2 | 3/2010 | Yamada et al. |
| 8,111,000 B2 | 2/2012 | Pekarski |
| 2004/0090188 A1* | 5/2004 | Ishizuka et al. ............... 315/291 |
| 2008/0068026 A1 | 3/2008 | Pekarski |
| 2010/0164383 A1 | 7/2010 | Munters et al. |

FOREIGN PATENT DOCUMENTS

| JP | 2001-357991 A | 12/2001 |
| JP | 2007-128777 A | 5/2007 |
| JP | A-2008-527405 | 7/2008 |
| JP | 2011-204492 A | 10/2011 |
| WO | 2006072852 | 7/2006 |
| WO | 2008020366 | 2/2008 |

OTHER PUBLICATIONS

The Extended European Search Report issued on Mar. 27, 2015 for the corresponding European Patent Application No. 14186123.7.

* cited by examiner

*Primary Examiner* — Tuyet Vo
(74) *Attorney, Agent, or Firm* — Lucas & Mercanti, LLP (57) ABSTRACT

A method of lighting a high-pressure discharge lamp is configured to change a power to be supplied to the high-pressure discharge lamp in accordance with a luminance parameter of an image content. The method includes switching between a low temperature operation and a high temperature operation so as to maintain a condition that mercury encapsulated into an arc tube part of the high-pressure discharge lamp constantly partially deposits without evaporating. The low temperature operation is performed where the temperature in the arc tube part is less than or equal to the deposition temperature of the mercury, whereas the high temperature operation is performed where the temperature in the arc tube part is greater than the deposition temperature of the mercury.

9 Claims, 4 Drawing Sheets

METHOD AND CIRCUIT FOR LIGHTING HIGH-PRESSURE DISCHARGE LAMP

CROSS REFERENCE TO RELATED APPLICATION

This application claims the priority of Japanese Patent Application No. 2013-228419 filed on Nov. 1, 2013, which is incorporated by reference herein.

BACKGROUND OF THE INVENTION

1. Field of the Invention

The present invention relates to a lighting method of a high-pressure discharge lamp and a lighting circuit for the same, whereby occurrence of deficit and distortion of a projected image can be avoided in applying the high-pressure discharge lamp to a projector or so forth.

2. Background Art

A high-pressure discharge lamp has been widely used for a projector and so forth, and is characterized in that quite a large amount of light is obtainable from a single high-pressure discharge lamp. In the high-pressure discharge lamp, a pair of electrodes is disposed in the internal space of an arc tube part made of silica glass, and mercury is encapsulated into the internal space. When voltage is applied to the electrodes, an arc discharge is generated. Accordingly, evaporated mercury is excited and emits light.

SUMMARY OF THE INVENTION

Publication of Japanese translation of PCT international application No. JP-A-2008-527405 describes a configuration of switching a projector between "a saturation operating mode" and "an unsaturation operating mode" in at least a part of the entire operating time by changing power to be supplied to a high-pressure discharge lamp in accordance with a luminance parameter of an image content for the purpose of achieving high contrast. In the saturation operating mode, mercury deposits within the arc tube part of the high-pressure discharge lamp. In the unsaturation operating mode, mercury entirely evaporates within the arc tube part.

However, there has been a drawback in such a technology as described in the publication No. JP-A-2008-527405, which is configured to cause a high-pressure discharge lamp to operate in a switchable manner between the state that mercury deposits within the arc tube part (the saturation operating mode) and the state that mercury entirely evaporates within the arc tube part (the unsaturation operating mode).

In short, when a large amount of mercury deposits within the arc tube part in the saturation operating mode, this will be a cause of blackening of the high-pressure discharge lamp. Such blackening of the high-pressure discharge lamp shields light emitted from an arc discharge region, and results in increase in local temperature within the arc tube part. This may cause bursting and damage of the arc tube part. On the other hand, convection within the arc tube part becomes greatly instable when pressure in the arc tube part is acutely changed due to continuous deposition and evaporation of mercury. The electrodes are thereby changed into undesired shapes and the origin of an arc discharge (i.e. the arc point) is displaced (i.e., an arc jump). This may cause flickering and may shorten the life of the high-pressure discharge lamp.

Further, when mercury deposits by switching the unsaturation operating mode into the saturation operating mode, it is unclear in which position mercury deposits within the arc tube part. Suppose mercury deposits on an optically important light path in a projector to which the high-pressure discharge lamp is applied, the deposited mercury is caught in a projected image and thereby a remarkable deficit may be caused.

Furthermore, in the course of growth of deposited mercury, the deposited mercury may move to a lower position within the arc tube part by the gravity or minute vibrations attributed to an arc discharge. Occurrence of such movement may cause distortion of a projected image.

The present invention has been developed in view of the aforementioned drawbacks of the conventional art. Therefore, it is a main object of the present invention to provide a lighting method of a high-pressure discharge lamp and a lighting circuit for the same, whereby occurrence of an arc jump can be avoided in an action of changing power to be supplied to the high-pressure discharge lamp in accordance with a luminance parameter of an image content; the life of the high-pressure discharge lamp can be prolonged; and occurrence of deficit and distortion in a projected image can be avoided.

According to an aspect of the present invention provides a method of lighting a high-pressure discharge lamp, which is configured to change a power to be supplied to the high-pressure discharge lamp in accordance with a luminance parameter of an image content. The method is characterized in comprising switching between a low temperature operation and a high temperature operation on an as-needed basis regardless of the luminance parameter so as to maintain a condition that mercury encapsulated into an arc tube part of the high-pressure discharge lamp constantly partially deposits without evaporating. The low temperature operation is performed where a temperature in the arc tube part is less than or equal to a deposition temperature of the mercury, whereas the high temperature operation is performed where the temperature in the arc tube part is higher than the deposition temperature of the mercury.

It is preferred that the switching between the low temperature operation and the high temperature operation is configured to be performed by switching the low temperature operation into the high temperature operation regardless of the luminance parameter when a ratio of an integral value of a product of a power value and an operating time in the high temperature operation to an integral value of a product of a power value and an operating time in the low temperature operation reaches a preliminarily set lower limit, and by switching the high temperature operation into the low temperature operation regardless of the luminance parameter when the ratio reaches a preliminarily set upper limit.

It is preferred that the switching between the low temperature operation and the high temperature operation is configured to be performed by switching the low temperature operation into the high temperature operation regardless of the luminance parameter when a ratio of an integral value of a product of a temperature within the arc tube part and an operating time in the high temperature operation to an integral value of a product of a temperature within the arc tube part and an operating time in the low temperature operation reaches a preliminarily set lower limit, and by switching the high temperature operation into the low temperature operation regardless of the luminance parameter when the ratio reaches a preliminarily set upper limit.

It is preferred that the switching between the low temperature operation and the high temperature operation is configured to be performed by switching the low temperature operation into the high temperature operation regardless of the luminance parameter when a continuous operating time in the low temperature operation reaches a predetermined period of time, and by switching the high temperature operation into the low temperature operation regardless of the luminance parameter when a continuous operating time in the high temperature operation reaches the or another predetermined period of time.

It is preferred that the switching between the low temperature operation and the high temperature operation is configured to be performed by switching the low temperature operation into the high temperature operation regardless of the luminance parameter when a ratio of a cumulative value of an operating time in the high temperature operation to a cumulated value of an operating time in the low temperature operation reaches a preliminarily set lower limit, and by switching the high temperature operation into the low temperature operation regardless of the luminance parameter when the ratio reaches a preliminarily set upper limit.

It is preferred that the switching between the low temperature operation and the high temperature operation is configured to be performed by changing the power to be supplied to the high-pressure discharge lamp.

It is preferred that the switching between the low temperature operation and the high temperature operation is configured to be performed by changing an amount of heat removed from the high-pressure discharge lamp.

It is preferred that the switching between the low temperature operation and the high temperature operation is configured to be performed by changing an amount of heat applied to the high-pressure discharge lamp.

According to an aspect of the present invention provides a lighting circuit for a high-pressure discharge lamp, which is configured to change a power to be supplied to the high-pressure discharge lamp in accordance with a luminance parameter of an image content. The lighting circuit is characterized in that it is configured to switch between a low temperature operation and a high temperature operation on an as-needed basis so as to maintain a condition that mercury encapsulated into an arc tube part of the high-pressure discharge lamp constantly partially deposits without evaporating. The low temperature operation is performed where a temperature in the arc tube part is less than or equal to a deposition temperature of the mercury, whereas the high temperature operation is performed where the temperature in the arc tube part is higher than the deposition temperature of the mercury.

In a conventional art, it has been unclear in which position mercury would deposit every time "the unsaturation operating mode" is switched into "the saturation operating mode". In the present invention, by contrast, it is possible to fix a position that mercury exists (i.e., a coolest point) because a condition is maintained that the encapsulated mercury constantly partially deposits in the internal space of the arc tube part. With such positional fixation of mercury, an optical system can be designed on the premise that mercury exists in the aforementioned position, and occurrence of deficit and distortion in a projected image can be avoided. Further, occurrence of acute variation in pressure within the arc tube part can be avoided. Hence, occurrence of an arc jump can be avoided and the life of the high-pressure discharge lamp can be prolonged.

BRIEF DESCRIPTION OF THE DRAWINGS

Referring now to the attached drawings which form a part of this original disclosure.

DETAILED DESCRIPTION OF EMBODIMENTS

Figure 1:
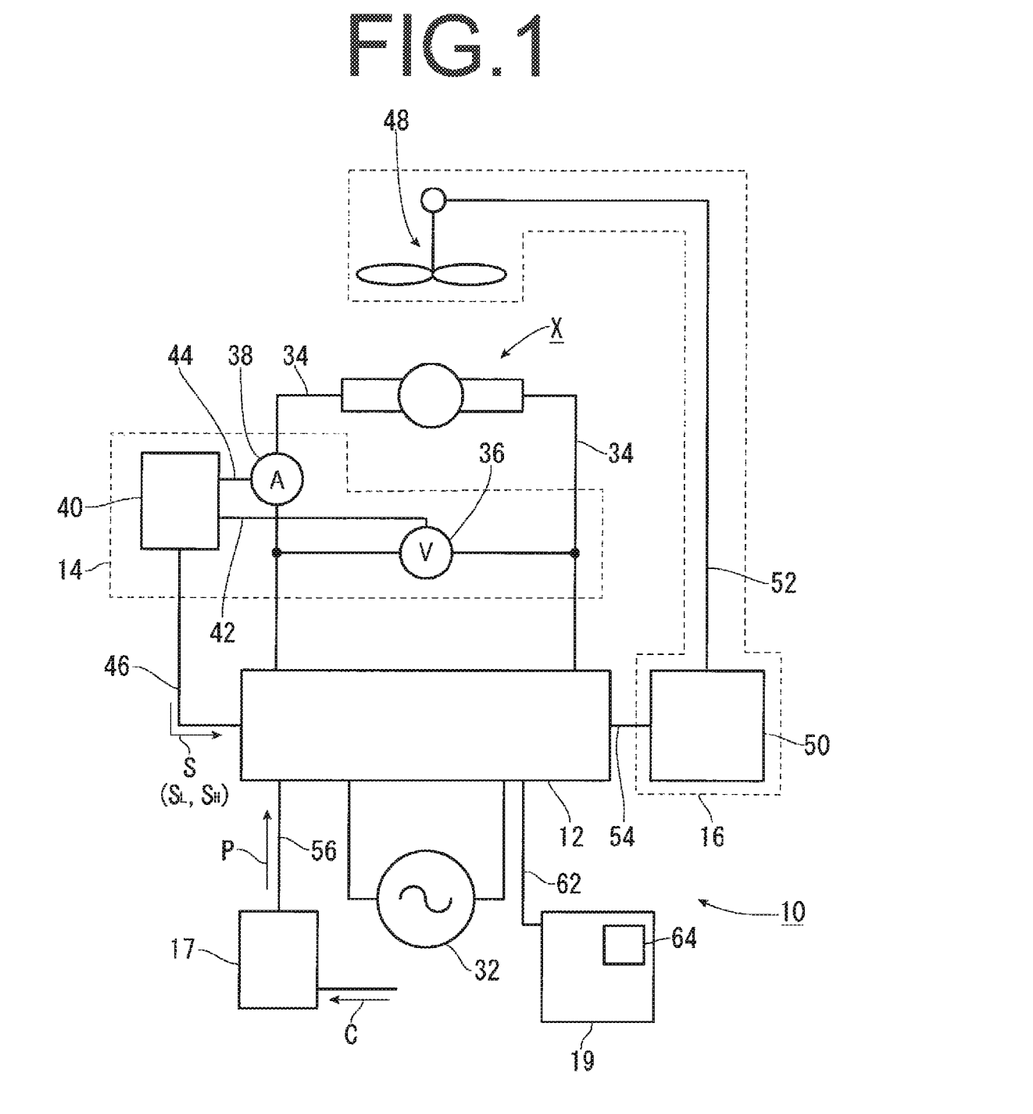
FIG. 1 is a circuit diagram showing an example (embodiment 1) of a lighting circuit to which the present invention is applied.

With reference to the attached drawings, explanation will be hereinafter made for an embodiment of a lighting circuit 10 to which the present invention is applied and that is configured to light a high-pressure discharge lamp X. As shown in FIG. 1, the lighting circuit 10 is mainly provided with a power supply circuit 12, a lighting state analyzing unit 14, a cooling unit 16, a luminance parameter determining unit 17 and an operation determining unit 19.

Figure 2:
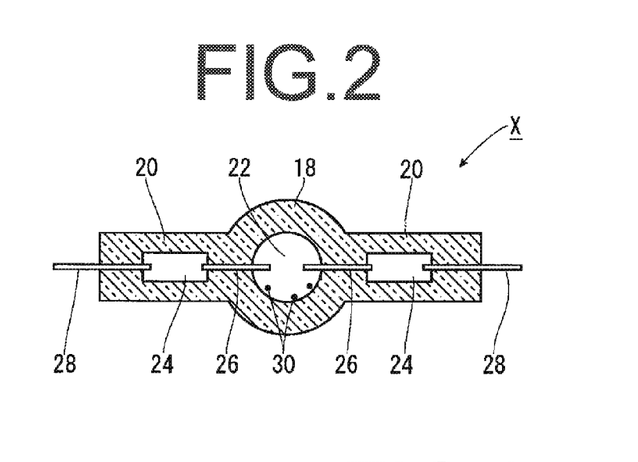
FIG. 2 is a diagram showing an example of a common high-pressure discharge lamp.

Firstly, brief explanation will be made for the high-pressure discharge lamp X. As shown in FIG. 2, the high-pressure discharge lamp X commonly has an arc tube part 18 and a pair of sealed parts 20. The arc tube part 18 and the sealed parts 20 are integrally made of silica glass. The sealed parts 20 extend from the arc tube part 18. An internal space 22 is produced in the interior of the arc tube part 18, and is sealed by the sealed parts 20. Further, a foil 24 made of molybdenum is buried in each sealed part 20. Yet further, the high-pressure discharge lamp X is provided with a pair of electrodes 26 and a pair of lead rods 28. Each electrode 26 is made of tungsten, and one end thereof is connected to one end of the foil 24 whereas the other end thereof is disposed in the internal space 22. Each lead rod 28 is disposed such that one end thereof is connected to the other end of the foil 24 whereas the other end thereof extends from the sealed part 20 to the outside. Moreover, a predetermined amount of mercury 30 and a predetermined amount of halogen (e.g., bromine) are encapsulated in the internal space 22.

When a voltage having a predetermined high value is applied to the pair of lead rods 28 disposed in the high-pressure discharge lamp X, a grow discharge, having started between the pair of electrodes 26 disposed in the internal space 22 of the arc tube part 18, transitions to an arc discharge. Then the mercury 30, evaporated/excited by the arc, emits light (in FIG. 2, black dots denoted with the reference number 30 are mercury in a deposited state).

Referring back to FIG. 1, the power supply circuit 12 is configured to receive electricity from a power source 32, convert the electricity into voltage and current that are suitable for lighting of the high-pressure discharge lamp X, and supply the converted electricity to the high-pressure discharge lamp X through a pair of lead wires 34. Detailed explanation will be described below for a method of lighting the high-pressure discharge lamp X by the power supply circuit 12.

The lighting state analyzing unit 14 has a function of analyzing a lighting state of the high-pressure discharge lamp X by the power supply circuit 12 on a real-time basis and returning the analysis result to the power supply circuit 12. In the present embodiment, the lighting state analyzing unit 14 is mainly composed of a voltmeter 36, an ammeter 38 and an analyzer circuit 40. The voltmeter 36 is installed between the pair of lead wires 34. The ammeter 38 is installed on either of the lead wires 34. The analyzer circuit 40 is configured to receive a voltage value V measured by the voltmeter 36 and a current value A measured by the ammeter 38, then analyze the lighting state of the high-pressure discharge lamp X on the basis of the values V and A, and transmit the analysis result to the power supply circuit 12. It should be noted that the analyzer circuit 40 and the voltmeter 36 are communicated through a voltage value transmitting line 42; the analyzer circuit 40 and the ammeter 38 are communicated through a current value transmitting line 44; and further, the analyzer circuit 40 and the power supply circuit 12 are communicated through an analysis result transmitting line 46.

The cooling unit 16 is mainly composed of a cooling fan 48 and a cooling fan control circuit 50. The cooling fan 48 is configured to mainly cool the arc tube part 18 of the high-pressure discharge lamp X. The rotational speed of the cooling fan 48 is configured to be controlled by the cooling fan control circuit 50. The cooling level of the high-pressure discharge lamp X (i.e., the amount of heat removed from the high-pressure discharge lamp X) is configured to be controlled. It should be noted that the cooling fan 48 and the cooling fan control circuit 50 are communicated through a fan control signal transmitting line 52.

The cooling fan control circuit 50 is communicated with the power supply circuit 12 through a cooling control signal transmitting line 54. The cooling fan control circuit 50 is configured to receive a cooling control signal from the power supply circuit 12 and control the cooling fan 48.

The luminance parameter determining unit 17 is configured to determine a luminance parameter P on the basis of an image content C provided thereto from an external device (e.g., a laptop computer, a tablet device, etc.), and is configured to provide the luminance parameter P to the power supply circuit 12. It should be noted that the luminance parameter determining unit 17 and the power supply circuit 12 are communicated through a luminance parameter signal transmitting line 56.

The operation determining unit 19 is communicated with the power supply circuit 12 through an operating information signal transmitting line 62, and is configured to receive a value of power to be supplied to the high-pressure discharge lamp X from the power supply circuit 12 through the operating information signal transmitting line 62 on a real-time basis. Receiving the value of power to be supplied to the high-pressure discharge lamp X on a real-time basis, the operation determining unit 19 is configured to give an order to the power supply circuit 12 through the operating information signal transmitting line 62 on the basis of the received power value and a piece of time information provided by a timer 64 embedded therein. The order, herein given to the power supply circuit 12, is one selected from the group consisting of an order of supplying power in accordance with the luminance parameter P, an order of supplying power to perform "a low temperature operation" in which the temperature in the internal space 22 of the arc tube part 18 of the high-pressure discharge lamp X is less than or equal to the deposition temperature of the mercury 30, and an order of supplying power to perform "a high temperature operation" in which the temperature in the internal space 22 is greater than the deposition temperature of the mercury 30. Explanation will be made below for how the operation determining unit 19 determines which one of the aforementioned orders is to be given.

Figure 3:
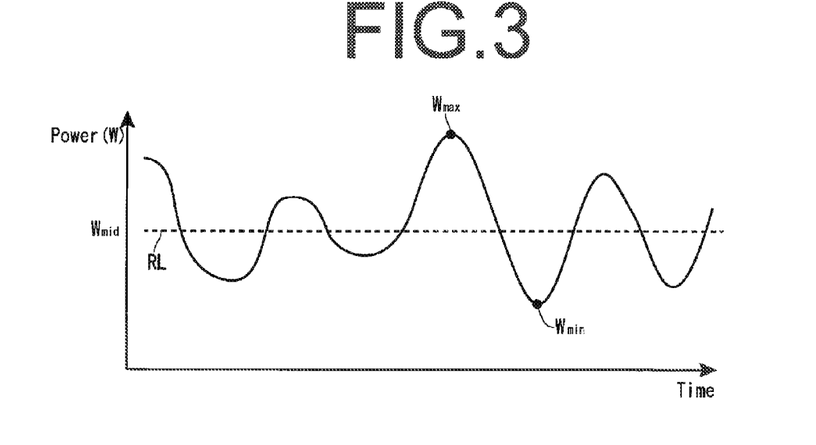
FIG. 3 is a chart showing an example that power to be supplied to the high-pressure discharge lamp is changed based on a luminance parameter of an image content.

Next, explanation will be made for an exemplary lighting control of the high-pressure discharge lamp X using the lighting circuit 10 of the present embodiment (embodiment 1). FIG. 3 is an exemplary chart obtainable in a condition that power to be supplied to the high-pressure discharge lamp X is changed based on the luminance parameter P of the image content C. In the present embodiment, the amount of heat removed by the cooling fan 48 (i.e., the rotation speed of the cooling fan 48) is configured to be determined such that the temperature in the internal space 22 of the arc tube part 18 of the high-pressure discharge lamp X can be the deposition temperature of the mercury 30 where a power $W_{mid}$ is supplied to the high-pressure discharge lamp X. The power $W_{mid}$ has a value roughly in the middle of the value of power $W_{max}$ and that of power $W_{min}$. The power $W_{max}$ is the maximum power to be supplied to the high-pressure discharge lamp X, whereas the power $W_{min}$ is the minimum power to be supplied to the high-pressure discharge lamp X. The cooling fan 48 is configured to be constantly operated at the rotation speed, and the amount of heat removed from the high-pressure discharge lamp X is basically configured not to vary.

In FIG. 3, a horizontal dashed line RL indicates the power $W_{mid}$. Therefore, where power to be supplied to the high-pressure discharge lamp X is less than or equal to a value plotted on the dashed line RL, "the low temperature operation" is performed in which the temperature in the internal space 22 of the arc tube part 18 of the high-pressure discharge lamp X is less than or equal to the deposition temperature of the mercury 30. Contrarily, where power to be supplied to the high-pressure discharge lamp X is greater than a value plotted on the dashed line RL, "the high temperature operation" is performed in which the temperature in the internal space 22 is greater than the deposition temperature of the mercury 30. In other words, the deposition amount of the mercury 30 in the internal space 22 of the arc tube part 18 is likely to be increased in "the low temperature operation", whereas the deposition amount of the mercury 30 in the internal space 22 of the arc tube part 18 is likely to be reduced in "the high temperature operation".

The value of power to be supplied from the power supply circuit 12 to the high-pressure discharge lamp X is configured to be transmitted to the operation determining unit 19 on a real-time basis. Therefore, the operation determining unit 19 discriminates which of "the low temperature operation" and "the high temperature operation" is currently performed by the high-pressure discharge lamp X by determining which of the following ranges the power value falls in: a range of less than or equal to the power $W_{mid}$ and a range of greater than the power $W_{mid}$.

In the present embodiment, the operation determining unit 19 is configured to use the timer 64 and cause it to count a period of time that each of the low temperature operation and the high temperature operation has been continuously performed. Further, when the supplied power in the high temperature operation is reduced and reaches the power $W_{mid}$, the operation determining unit 19 is configured to reset the timer 64 that has counted the continuous operating time in the high temperature operation and to count anew the continuous operating time in the low temperature operation. Contrarily, when the supplied power in the low temperature operation is increased and exceeds the power $W_{mid}$, the operation determining unit 19 is configured to reset the timer 64 that has counted the continuous operating time in the low temperature operation and to count anew the continuous operating time in the high temperature operation.

When the continuous operating time in the low temperature operation is prolonged, an excessive amount of the mercury 30 inevitably deposits in the internal space 22 of the arc tube part 18 of the high-pressure discharge lamp X. Accordingly, the light emission amount from the high-pressure discharge lamp X is remarkably reduced. Further, a halogen cycle is hindered, and tungsten, of which the electrode 26 is made, deposits on the inner wall of the arc tube part 18 (a blackening phenomenon). Contrarily, when the continuous operating time in the high temperature operation is prolonged, the mercury 30 inevitably entirely evaporates in the internal space 22 of the arc tube part 18.

A continuous operating time tolerable for each temperature operation (i.e., a continuous operating time not causing the aforementioned drawbacks) has been preliminarily researched through experiments and/or so forth, and is set in the operation determining unit 19. Therefore, the operation determining unit 19 is configured to switch between the operating modes regardless of the luminance parameter P when the aforementioned counted continuous operating time in each temperature operation reaches a predetermined period of time. Specifically, when the continuous operating time in the low temperature operation reaches a predetermined period of time, the operation determining unit 19 is configured to transmit an order of switching the low temperature operation into the high temperature operation to the power supply circuit 12 through the operating information signal transmitting line 62. Contrarily, when the continuous operating time in the high temperature operation reaches a predetermined period of time, the operation determining unit 19 is configured to transmit an order of switching the high temperature operation into the low temperature operation to the power supply circuit 12 through the operating information signal transmitting line 62.

Receiving the order of switching between the operating modes, the power supply circuit 12 is configured to switch the present operating mode to the other operating mode in accordance with the order. For example, when receiving the order of switching from the low temperature operation into the high temperature operation, the power supply circuit 12 is configured to supply a preliminarily set power greater than the power $W_{mid}$ to the high-pressure discharge lamp X. Contrarily, when receiving the order of switching the high temperature operation into the low temperature operation, the power supply circuit 12 is configured to supply a preliminarily set power less than the power $W_{mid}$ to the high-pressure discharge lamp X.

With the operation determining unit 19 being thus actuated, it is possible to maintain a condition that the mercury 30, encapsulated into the internal space 22 of the arc tube part 18, constantly partially deposits without evaporating. Hence, it is possible to fix the position (the coolest point) that the mercury 30 exists. With such positional fixation of the mercury 30, an optical system can be designed on the premise that the mercury 30 exists in the fixed position. It is thereby possible to avoid occurrence of deficit and distortion of a projected image. Further, it is possible to avoid occurrence of acute variation in pressure within the arc tube part. Hence, occurrence of an arc jump can be avoided, and the life of the high-pressure discharge lamp can be prolonged.

It should be noted that the values to be preliminarily set for power may have arbitrary magnitudes. However, when the preliminarily set values of power are greatly different from the power $W_{mid}$, luminance greatly varies in switching between the operating modes regardless of the luminance parameter P. This may make a user feel strange. Thus, each of the preliminarily set values of power is preferably either a little greater than the power $W_{mid}$ (in switching the low temperature operation into the high temperature operation) or a little less than the power $W_{mid}$ (in switching the high temperature operation into the low temperature operation).

On the other hand, variation in emission amount, attributed to variation in value of the supplied power regardless of the luminance parameter P of the image content C, is configured to be dealt by optical devices (e.g., a display, a grey filter, a diaphragm, a deflector, etc.) embedded in a projector or so forth.

Further, an arbitrary method can be employed, on the premise that it is possible to maintain a condition that the encapsulated mercury 30 constantly partially deposits without evaporating, in order to deactivate the configuration of switching between the operating modes regardless of the luminance parameter P and re-activate the configuration of changing the supplied power in accordance with the luminance parameter P. For example, in an assumable method, power having a predetermined value is configured to be constantly supplied after switching between the operating modes; the constant power supply is configured to be stopped after the power value in accordance with the luminance parameter P becomes equal to the predetermined power value; and the supplied power is again configured to be changed in accordance with the luminance parameter P. Obviously, the operation determining unit 19 is configured to continuously count the continuous operating time even when the constant power supply is performed. Thus, even before the power in accordance with the luminance parameter P becomes equal to the predetermined power value, constant power supply in one temperature operation is configured to be switched into that in the other temperature operation when the continuous operating time reaches a preliminarily set time.

Incidentally, the temperature in the internal space 22 of the arc tube part 18 varies in an actual situation due to various factors even when lighting is continued in the predetermined operating mode. In view of this, the lighting circuit 10 of the present embodiment is provided with the lighting state analyzing unit 14 for making the actual temperature close to the preliminarily set temperature so as to cope with such variation.

Explanation will be herein made for the action of the lighting state analyzing unit 14. The voltage value V and the current value A, supplied to the high-pressure discharge lamp X, are respectively configured to be transmitted from the voltmeter 36 and the ammeter 38 to the analyzer circuit 40 on a real-time basis. Receiving the voltage value V and the current value A, the analyzer circuit 40 is configured to monitor the trend of the voltage value V and that of the current value A. Even in a condition that constant power is supplied to the high-pressure discharge lamp X, the temperature in the internal space 22 of the arc tube part 18 is likely to be higher than the preliminarily set temperature when the inter-electrode distance (i.e., arc length) is elongated. At this time, the voltage value V to be supplied to the high-pressure discharge lamp X is greater than a preliminarily set voltage value, whereas the current value A to be supplied to the high-pressure discharge lamp X is less than a preliminarily set current value. When the aforementioned state (i.e., the temperature in the internal space 22 is higher than the preliminarily set temperature) is confirmed based on the trend of the voltage value V and that of the current value A, the analyzer circuit 40 is configured to transmit a signal $S_H$ to the power supply circuit 12 through the analysis result transmitting line 46. It should be noted that the signal $S_H$ indicates that the temperature in the internal space 22 is high. When receiving such signal $S_H$, the power supply circuit 12 is configured to transmit a signal to the cooling fan control circuit 50 through the cooling control signal transmitting line 54 in order to cause the cooling fan control circuit 50 to increase the amount of heat removed by the cooling fan 48. When receiving such signal, the cooling fan control circuit 50 is configured to increase the amount of heat removed by the cooling fan 48

(specifically, the cooling fan control circuit 50 is configured to increase the rotation speed of the cooling fan 48).

Contrarily, when the voltage value V is less than the preliminarily set voltage value whereas the current value A is greater than the preliminarily set current value even though constant power is supplied to the high-pressure discharge lamp X, the inter-electrode distance is short and the temperature in the internal space 22 of the arc tube part 18 of the high-pressure discharge lamp X is less than the preliminarily set temperature. In this case, the analyzer circuit 40 is configured to transmit a signal $S_L$ to the power supply circuit 12. It should be noted that the signal $S_L$ indicates that the temperature in the internal space 22 is low. When receiving such signal $S_L$, the power supply circuit 12 is configured to transmit a signal to the cooling fan control circuit 50 through the cooling control signal transmitting line 54 in order to cause the cooling fan control circuit 50 to reduce the amount of heat removed by the cooling fan 48. When receiving such signal, the cooling fan control circuit 50 is configured to reduce the amount of heat removed by the cooling fan 48 (specifically, the cooling fan control circuit 50 is configured to reduce the rotation speed of the cooling fan 48).

With the lighting state analyzing unit 14 being thus used, variation in temperature within the arc tube part 18 can be inhibited as much as possible in the condition that predetermined power is supplied to the high-pressure discharge lamp X, and thus, the temperature within the arc tube part 18 can be easily maintained at the preliminarily set temperature. It should be noted that the current value A to be supplied to the high-pressure discharge lamp X is generally configured to be determined based on the power to be supplied and the real-time voltage value V (i.e., the current value A cannot be arbitrarily set). Hence, the amount of heat removed by the cooling fan 48 may be configured to be increased or reduced based on monitoring of the relation between the power to be supplied and the voltage value V.

Furthermore, the lighting state analyzing unit 14 is also usable for avoiding such a situation that the temperature in the internal space 22 of the arc tube part 18 actually becomes extremely high or excessively low. Specifically, upper and lower limits are preliminarily set for the voltage value V to be supplied to the high-pressure discharge lamp X. When the voltage value V reaches its upper limit during real-time monitoring, it is determined that the arc length is long and the temperature in the internal space 22 of the arc tube part 18 is extremely high. Contrarily, when the voltage value V reaches the lower limit during real-time monitoring, it is determined that the arc length is short and the temperature in the internal space 22 of the arc tube part 18 is extremely low. In the above case, it is assumable to avoid the situation that the temperature in the internal space 22 of the arc tube part 18 becomes extremely high or extremely low by changing power regardless of the luminance parameter P, changing the amount of heat removed by the cooling fan 48, or so forth.

(Embodiment 2)

In the aforementioned embodiment 1, the low temperature operation and the high temperature operation are configured to be switched based on the continuous operating time thereof. However, the low temperature operation and the high temperature operation may be switched based on "a ratio of a cumulative value of the operating time in one temperature operation to a cumulative value of the operating time in the other temperature operation" instead of the continuous operating time. Specifically, when a ratio of a cumulative value of the operating time in the high temperature operation to a cumulative value of the operating time in the low temperature operation reaches a preliminarily set lower limit, the low temperature operation may be configured to be switched into the high temperature operation regardless of the luminance parameter P. Contrarily, when the aforementioned ratio reaches a preliminarily set upper limit, the high temperature operation may be configured to be switched into the low temperature operation regardless of the luminance parameter P.

Figure 4:
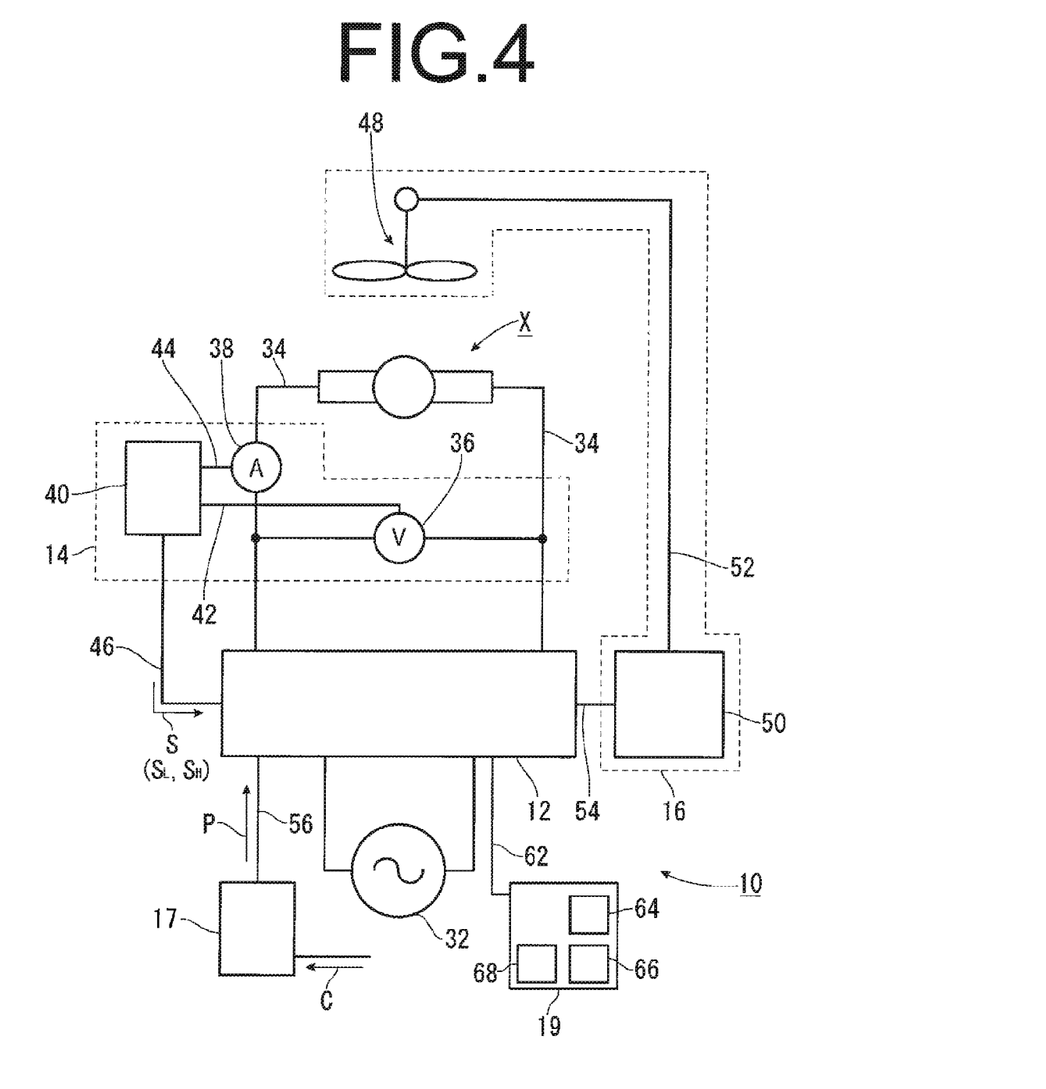
FIG. 4 is a circuit diagram showing another example (embodiment 2 and 3) of the lighting circuit to which the present invention is applied.

As shown in FIG. 4, the operation determining unit 19 of the lighting circuit 10 according to the present embodiment 2 further includes an integration memory 66 for accumulating the operating time of each temperature operation and an arithmetic-and-logic circuit 68. In the operation determining unit 19, the integration memory 66 is configured to respectively accumulate and store a period of time that the value of power to be supplied from the power supply circuit 12 to the high-pressure discharge lamp X falls in the range of value corresponding to the low temperature operation (i.e., the operating time in the low temperature operation) and a period of time that the aforementioned power value falls in the range of value corresponding to the high temperature operation (i.e., the operating time in the high temperature operation). Further, based on the respective cumulative values stored in the integration memory 66, the arithmetic-and-logic circuit 68 is configured to calculate a ratio of the cumulative value of the operating time in the high temperature operation to the cumulative value of the operating time in the low temperature operation. When the ratio obtained by the calculation reaches the preliminarily set lower limit (i.e., when the cumulative value of the operating time in the low temperature operation is much greater than that of the operating time in the high temperature operation), the operation determining unit 19 is configured to order the power supply circuit 12 to switch the low temperature operation into the high temperature operation regardless of the luminance parameter P. Contrarily, when the ratio obtained by the calculation reaches the preliminarily set upper limit (i.e., when the cumulative value of the operating time in the high temperature operation is much greater than that of the operating time in the low temperature operation), the operation determining unit 19 is configured to order the power supply circuit 12 to switch the high temperature operation into the low temperature operation regardless of the luminance parameter P.

(Embodiment 3)

In the embodiment 1 and 2, it is configured to be determined whether each temperature operation should be continued or should be switched into the other temperature operation only with use of the operating time of each temperature operation. However, even in the high temperature operation, the evaporation speed of mercury deposited in the internal space 22 of the arc tube part 18 depends on a condition of the high temperature operation. For example, the evaporation speed varies between a condition that the high temperature operation is performed at a high temperature slightly higher than the temperature at which the power $W_{mid}$ is supplied and a condition that the high temperature operation is performed at a high temperature at which the maximum power $W_{max}$ is supplied.

In view of the above, in the present embodiment 3, "an integral value of a product of a power value and an operating time in each temperature operation" is designed to be used for more accurately controlling the deposited state of a part of the encapsulated mercury 30. In other words, when a ratio of "an integral value of a product of a power value and an operating time in the high temperature operation" to "an integral value of a product of a power value and an operating time in the low temperature operation" reaches a preliminarily set lower limit, the low temperature operation is configured to be switched into the high temperature operation regardless of the luminance parameter P. Contrarily, when the aforementioned ratio reaches a preliminarily set upper limit, the high temperature operation is configured to be switched into the low temperature operation regardless of the luminance parameter P.

Specifically, the arithmetic-and-logic circuit 68 is configured to calculate the product of the value of power obtained from the power supply circuit 12 and the operating time obtained with use of the timer 64, and the integration memory 66 is configured to store the integral value of the product. The arithmetic-and-logic circuit 68 is further configured to calculate the ratio of the integral value in the high temperature operation to that in the low temperature operation with use of the integral values stored in the integration memory 66. When the ratio obtained by the calculation reaches the preliminarily set lower limit (i.e., when the integral value in the low temperature operation is much greater than that in the high temperature operation), the operation determining unit 19 is configured to order the power supply circuit 12 to switch the low temperature operation into the high temperature operation regardless of the luminance parameter P. Contrarily, when the ratio obtained by the calculation reaches the preliminarily set upper limit (i.e., when the integral value in the high temperature operation is much greater than that in the low temperature operation), the operation determining unit 19 is configured to order the power supply circuit 12 to switch the high temperature operation into the low temperature operation regardless of the luminance parameter P.

It should be noted that in the aforementioned embodiment 3, an integral value of a product of "power value" and "operating time" is used. However, an integral value of a product of "temperature in the internal space 22" (instead of "power value") and "operating time" may be used when the temperature in the internal space 22 of the arc tube part 18, corresponding to the supplied power to the high-pressure discharge lamp X, has been preliminarily obtained.

(Embodiment 4)

In the aforementioned embodiment 1 to 3, the low temperature operation and the high temperature operation are configured to be switched by changing the value of power to be supplied to the high-pressure discharge lamp X. Alternatively, the low temperature operation and the high temperature operation may be configured to be switched by changing the amount of heat removed by the cooling fan 48.

Specifically, in switching the low temperature operation into the high temperature operation, the operation determining unit 19 is configured to transmit an order to the cooling fan control circuit 50 through the power supply circuit 12 in order to cause the cooling fan control circuit 50 to reduce the rotation speed of the cooling fan 48. When receiving such order, the cooling fan control circuit 50 is configured to reduce the rotation speed of the cooling fan 48 so as to reduce the amount of heat removed by the cooling fan 48. The temperature in the internal space 22 of the arc tube part 18 can be thereby increased. Contrarily, in switching the high temperature operation into the low temperature operation, the rotation speed of the cooling fan 48 is configured to be increased so as to increase the amount of heat removed by the cooling fan 48. The temperature in the internal space 22 of the arc tube part 18 can be thereby reduced.

(Example 5)

Figure 5:
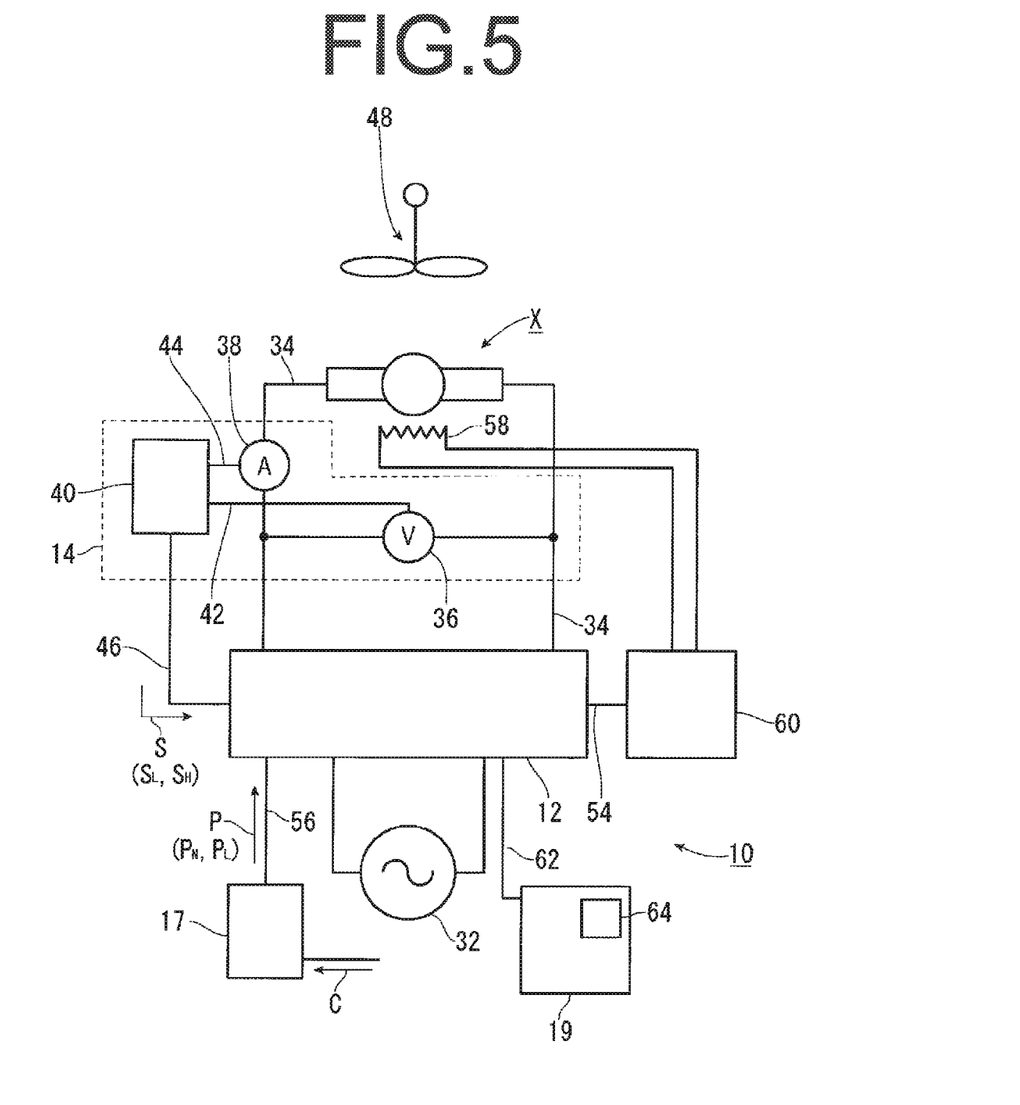
FIG. 5 is a circuit diagram showing yet another example (embodiment 5) of the lighting circuit to which the present invention is applied.

Alternatively, as shown in FIG. 5, a heater 58 may be further installed for heating the internal space 22, and a heater control circuit 60 may be installed instead of the cooling fan control circuit 50. Further, the low temperature operation and the high temperature operation may be herein configured to be switched by causing the heater control circuit 60 to control the amount of heat applied by the heater 58. It should be noted that the other structure and configuration are similar to those of the embodiment 1 (note the cooling control signal transmitting line 54 should be herein interpreted as a heating control signal transmitting line 54).

In the present embodiment, the cooling fan 48 maintains a constant rotation speed regardless of variation in supplied power in accordance with the luminance parameter P of the image content C, further, variation in temperature in the internal space 22 attributed to an external factor, and so forth. In other words, the amount of heat removed by the cooling fan 48 is basically roughly constant.

For example, in switching the low temperature operation into the high temperature operation, the operation determining unit 19 is configured to transmit an order to the heater control circuit 60 through the power supply circuit 12 in order to cause the heater control circuit 60 to increase the amount of heat applied by the heater 58. When receiving such order, the heater control circuit 60 is configured to increase the amount of heat applied by the heater 58. The temperature in the internal space 22 of the arc tube part 18 can be thereby increased. Contrarily, in switching the high temperature operation into the low temperature operation, the heater control circuit 60 is configured to reduce the amount of heat applied by the heater 58. The temperature in the internal space 22 of the arc tube part 18 can be thereby reduced.

Although the invention has been described in its preferred form with a certain degree of particularity, it is understood that the present disclosure of the preferred form has been changed in the details of construction and the combination and arrangement of parts may be resorted to without departing from the spirit and scope of the invention as hereinafter claimed.

The disclosure of Japanese Patent Application No. 2013-228419 Nov. 1, 2013 including specification, drawings and claims is incorporated herein by reference in its entirely.

What is claimed is:

1. A method of lighting a high-pressure discharge lamp being configured to change a power to be supplied to the high-pressure discharge lamp in accordance with a luminance parameter of an image content, comprising:

switching between a low temperature operation and a high temperature operation on an as-needed basis regardless of the luminance parameter so as to maintain a condition that mercury encapsulated into an arc tube part of the high-pressure discharge lamp constantly partially deposits without evaporating, the low temperature operation being performed where a temperature in the arc tube part is less than or equal to a deposition temperature of the mercury, the high temperature operation being performed where the temperature in the arc tube part is higher than the deposition temperature of the mercury.

2. The method according to claim 1, wherein the switching between the low temperature operation and the high temperature operation is configured to be performed by switching the low temperature operation into the high temperature operation regardless of the luminance parameter when a ratio of an integral value of a product of a power value and an operating time in the high temperature operation to an integral value of a product of a power value and an operating time in the low temperature operation reaches a preliminarily set lower limit, and by switching the high temperature operation into the low temperature operation regardless of the luminance parameter when the ratio reaches a preliminarily set upper limit.

3. The method according to claim 1, wherein the switching between the low temperature operation and the high temperature operation is configured to be performed by switching the low temperature operation into the high temperature operation regardless of the luminance parameter when a ratio of an integral value of a product of a temperature within the arc tube part and an operating time in the high temperature operation to an integral value of a product of a temperature within the arc tube part and an operating time in the low temperature operation reaches a preliminarily set lower limit, and by switching the high temperature operation into the low temperature operation regardless of the luminance parameter when the ratio reaches a preliminarily set upper limit.

4. The method according to claim 1, wherein the switching between the low temperature operation and the high temperature operation is configured to be performed by switching the low temperature operation into the high temperature operation regardless of the luminance parameter when a continuous operating time in the low temperature operation reaches a predetermined period of time, and by switching the high temperature operation into the low temperature operation regardless of the luminance parameter when a continuous operating time in the high temperature operation reaches the or another predetermined period of time.

5. The method according to claim 1, wherein the switching between the low temperature operation and the high temperature operation is configured to be performed by switching the low temperature operation into the high temperature operation regardless of the luminance parameter when a ratio of a cumulative value of an operating time in the high temperature operation to a cumulated value of an operating time in the low temperature operation reaches a preliminarily set lower limit, and by switching the high temperature operation into the low temperature operation regardless of the luminance parameter when the ratio reaches a preliminarily set upper limit.

6. The method according to claim 1, wherein the switching between the low temperature operation and the high temperature operation is configured to be performed by changing the power to be supplied to the high-pressure discharge lamp.

7. The method according to claim 1, wherein the switching between the low temperature operation and the high temperature operation is configured to be performed by changing an amount of heat removed from the high-pressure discharge lamp.

8. The method according to claim 1, wherein the switching between the low temperature operation and the high temperature operation is configured to be performed by changing an amount of heat applied to the high-pressure discharge lamp.

9. A lighting circuit for a high-pressure discharge lamp being configured to change a power to be supplied to the high-pressure discharge lamp in accordance with a luminance parameter of an image content, the lighting circuit being configured to switch between a low temperature operation and a high temperature operation on an as-needed basis so as to maintain a condition that mercury encapsulated into an arc tube part of the high-pressure discharge lamp constantly partially deposits without evaporating, the low temperature operation being performed where a temperature in the arc tube part is less than or equal to a deposition temperature of the mercury, the high temperature operation being performed where the temperature in the arc tube part is higher than the deposition temperature of the mercury.

\* \* \* \* \*